Figure 1:
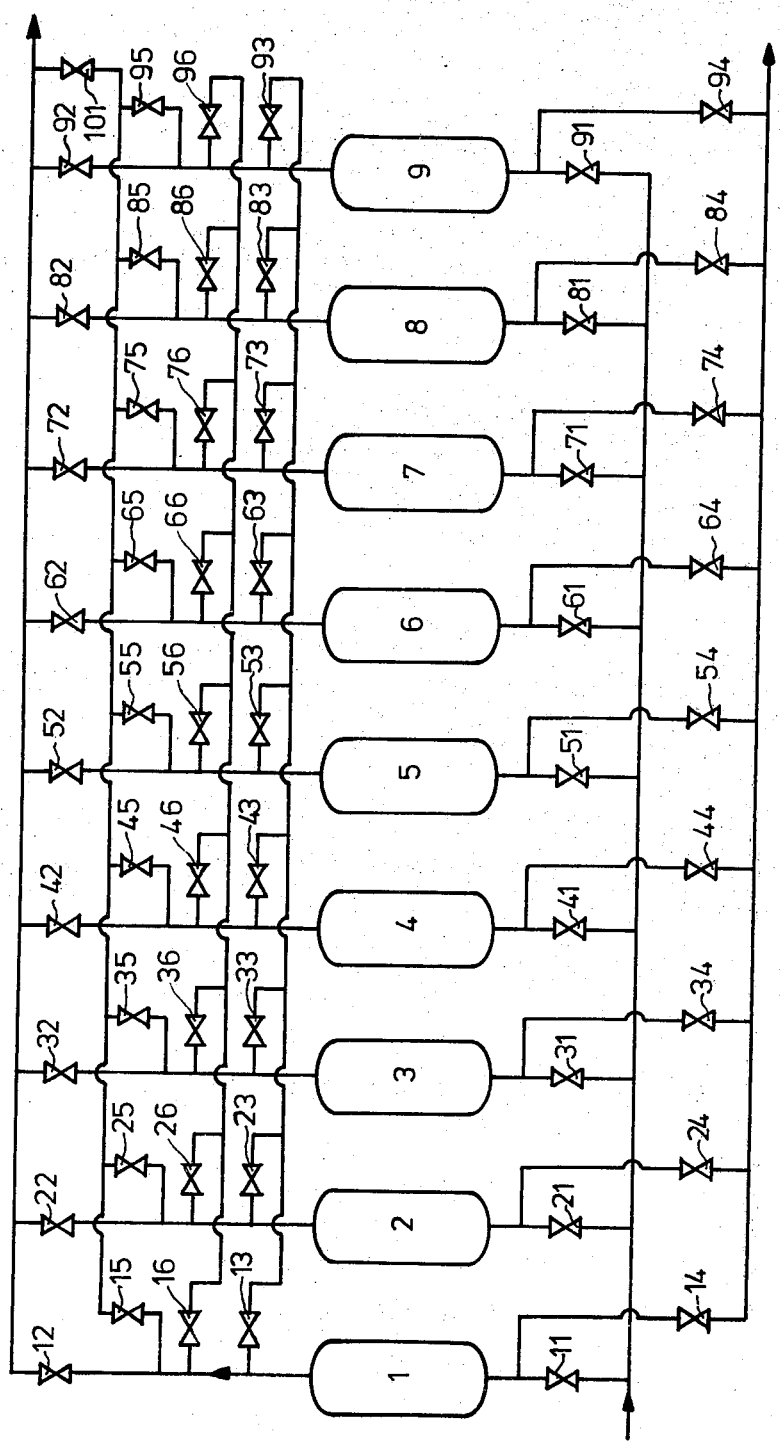

United States Patent [19]
De Meyer et al.

[11] 4,234,322
[45] Nov. 18, 1980

[54] PRESSURE SWING ADSORPTION PROCESS

[75] Inventors: Herman De Meyer, Ekeren; Roland Doclo, Schilde-'s Gravenwezel; Jan Seynaeve, Brasschaat, all of Belgium

[73] Assignee: Bayer Aktiengesellschaft, Leverkusen, Fed. Rep. of Germany

[21] Appl. No.: 41,662

[22] Filed: May 23, 1979

[30] Foreign Application Priority Data
May 27, 1978 [DE] Fed. Rep. of Germany ....... 2823211

[51] Int. Cl.³ .............................................. B01D 53/04
[52] U.S. Cl. .......................................... 55/18; 55/21; 55/25; 55/58; 55/62
[58] Field of Search ................... 55/18, 21, 25, 26, 58, 55/62, 74, 75

[56] References Cited
U.S. PATENT DOCUMENTS

| | | | |
|---|---|---|---|
| 3,564,816 | 2/1971 | Batta | 55/26 |
| 3,703,068 | 11/1972 | Wagner | 55/21 |
| 3,986,849 | 10/1976 | Fuderer et al. | 55/25 |
| 4,140,495 | 2/1979 | Pietruszewski | 55/25 X |

FOREIGN PATENT DOCUMENTS 2624346 12/1977 Fed. Rep. of Germany ............. 55/25

Primary Examiner—Robert H. Spitzer
Attorney, Agent, or Firm—Sprung, Felfe, Horn, Lynch & Kramer

[57] ABSTRACT

An adiabatic pressure swing adsorption process for the separation of gas mixtures by adsorbing at least one gas component in each of at least eight phase staggered operated adsorbent beds, which can be continued to be operated without any stoppage of installation even if one adsorbent bed is removed from operation due to a defective valve.

6 Claims, 3 Drawing Figures

FIG. 2

| Adsorber Nr. \ Takt Nr. | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | B1 | B | B2 | | B3 | | B4 | | BD | | | | | | | | | |
| 2 | B3 | B2 | B1 | B | | A | | E1 | E3 | E4 | P | BD | Sp | B4 | B3 | B2 | B1 | B |
| 3 | Sp | B4 | B3 | B2 | B1 | B | | E2 | E1 | E2 | E3 | E4 | P | BD | Sp | B4 | B3 | B2 |
| 4 | P | BD | Sp | B4 | B3 | B2 | B1 | B | | | | | | | | | | B4 |
| 5 | E3 | E4 | P | BD | Sp | B4 | B3 | B2 | B1 | B | | A | | BD | P | BD | Sp | BD |
| 6 | E1 | E2 | E3 | E4 | P | BD | Sp | B4 | B3 | B2 | B1 | B | | | E3 | E4 | P | E4 |
| 7 | | E1 | E2 | E3 | E4 | | | E4 | E3 | E1 | E1 | E2 | E1 | E2 | E1 | E2 | E3 | E2 |
| 8 | A | | | | | | | A | | | | | A | | | A | | A |
| 9 | | | | | | | | | | | | | | | B | B1 | | A |

FIG. 3

PRESSURE SWING ADSORPTION PROCESS

Pressure-swing adsorption installations are used to separate gas mixtures, for example hydrogen, from carbon dioxide and nitrogen impurities, by adsorption in an adiabatic pressure swing process. The adsorption of the impurities takes place in adsorbent beds, which, for example, according to U.S. Pat. No. 3,564,816 contain activated charcoal in a first section and crystalline calcium zeolite A in a second section. The gas to be purified flows through the adsorbent beds, the impurities being adsorbed under a pressure of for example 15 to 20 bars. In this way a hydrogen product gas of 99.9999% purity is for example obtained. The adsorbent beds have to be regenerated at regular intervals; the pressure prevailing in the bed has first of all to be removed both on the product side and on the crude gas side, before the bed can be countercurrently purged in order to remove the adsorbed impurities. Owing to the mechanical sensitivity of the adsorbent beds the depressurizing repressurizing has to take place gradually so that no great pressure differences between the product side and the crude gas side can form. Each individual adsorbent bed is therefore operated in 4 operational phases:

1. repressurizing phase
2. adsorption phase
3. depressurizing phase
4. purging phase etc.

It has therefore proven to be appropriate to operate several adsorbent beds parallel to each other at staggered phases, that the respressurization in one adsorbent bed can in each case take place by pressure equalization with another adsorbent bed undergoing the depressurization phase.

In order to avoid losses in gas and in order to save energy now the tendency is to operate a number of adsorbent beds, parallel to each other in order to keep to a minimum the difference in pressure between the phases in the adsorbent beds undergoing pressure equalization at one particular time and to achieve thus achieve an almost adiabatic pressure swing process.

Such a process, in which for example 7–10 adsorbent beds are operated parallel to each other, is for example described in the U.S. Pat. No. 3,986,849. The repressurization and depressurization takes place in this known process via at least 3 pressure-equalizing phases, the pressure equalization taking place in 2 adsorbent beds having adjacent pressure ranges. Naturally, in the case of such adiabatic pressure swing processes the number of valves and connecting pipes necessary for controlling the cycle process increases as the number of adsorbent beds used parallel to each other increases. For example, the number of valves necessary in the process with 10 adsorbent beds according to U.S. Pat. No. 3,986,849 is 55. With a process cycle of approx. 15 minutes each of these valves is operated at least twice usually, however, four times, according to a prescribed pattern of valve operation. In order to ensure that the pressure equalization is as linear as possible sensitive, adjustable valves are used. The pressure equalization takes place via joint connective pipes between all of the adsorbent beds, which according to the prescribed valve operation pattern are used at intervals between 2 adsorbent beds at a time. In the case of one valve being faulty, for example when one valve no longer shuts completely, pressure losses occur in the adsorbent beds and in the pipe system which necessitate stopping the process and testing a number of valves which could possibly be faulty, detecting the faulty valve, replacing it and restarting the installation. Such a defect therefore causes stoppages of the installation, gas losses and power losses caused by repressurization and depressurization.

A process has now been found according to which the named adiabatic pressure swing process installations can be operated with a number of pressure adsorption units operated parallel to each other, without it being necessary to stop the installation in the case of a faulty valve.

The present invention refers to an adiabatic pressure swing adsorption process for separation of gas mixtures by adsorbing at least one gas component in each of at least eight phase staggered operated adsorbent beds; wherein each of the adsorbent beds is cyclically operated in subsequent operation steps "adsorption", at least two "depressurization" steps, "counter-current purging", and at least two "repressurization" steps; "depressurization" ("repressurization") being established by pressure equalization with another adsorbent bed being operated in the operation steps "repressurization" ("depressurization") of adjacent pressure range by means of a number of connecting tubes and valves opening from said adsorbent beds to said connecting tubes; the valves being switched according to a predetermination first valve operation pattern; switching of valves being initiated when a first characteristic physical quantity has reached a pretermined value; wherein further on periodically are compared measured actual values with predetermined nominal values of a second physical quantity characteristic for each operation step; in the case of deviations of the actual values from the nominal values, any valve is identified being potentially defective and therefore potentially responsible for said deviations in any of subsequent operation steps after the first occurence of a deviation; the actual defective valve is identified as being the sole valve being identified as potentially defective in any of a sufficient number of operation steps to exclude other valves being also identified as potentially defective in the said operation step of first occurance of deviation; the adsorption bed to which the defective valve belongs is removed from operation by continuing operation of the remaining adsorption beds according to a second valve operation pattern predefined for a such reduced number of adsorption beds.

The process according to the present invention is more clearly understood by first making reference to the accompanying drawings:

FIG. 1 is a schematic of a pressure swing adsorption installation according to the invention; and FIGS. 2 and 3 are valve operation patterns.

FIG. 1 illustrates as an example a pressure swing adsorption installation consisting of 9 units, the adsorption units being marked with the numbers 1 to 9. The valves are marked with double figures, the first figure of these numbers corresponding to the number of the adsorption unit to which they belong. The second figure of the two-figure number marking the valve denotes in each case the type of valve:

Terminal number 1 denotes the inlet valve for the crude gas;

terminal number 2 denotes the outlet valve for the pure gas;

terminal number 4 denotes the outlet valve for the countercurrent purging gas;

terminal number 5 denotes the valve for repressuring from the pure hydrogen system and terminal numbers 3 and 6 denote valves opening pressure equalizing pipes.

101 denotes a valve which allows metering during the filling up from the pure hydrogen system.

FIG. 2 presents a typical predetermined first valve operation pattern taking into consideration all nine adsorbent beds. In this the figures on the top denote the subsequent valve operation steps, the vertical figures on the left denote the individual adsorbent beds, further on A = adsorption phase E1 = first depressurization step by pressure equalization with an adsorption unit in the repressurization step B1

E2 = second depressurization step by pressure equalization with an adsorption unit in the repressurization step B2

E3 = third depressurization step by pressure equalization with an adsorption unit in the repressurization step B3

E4 = fourth depressurization step, by pressure equalization with an adsorption phase in the repressurization step B4.

B = fifth depressurization step for purging an adsorption unit in the countercurrent purging phase Sp.

BD = emptying of the adsorption unit into the residual gas system

Sp = purging phase (the gas from an adsorption unit in the depressurization step P flows through the adsorption unit to the residual gas system).

B4 = first repressurization step by pressure equalization with an adsorption unit in the phase E4.

B3 = second repressurization step

B2 = third repressurization step

B1 = fourth repressurization step

B = repressurization (from the pure gas system).

One process cycle according to this pattern consists of 18 steps, 6 steps of a cycle in each case being available for the adsorption.

Figure 3:
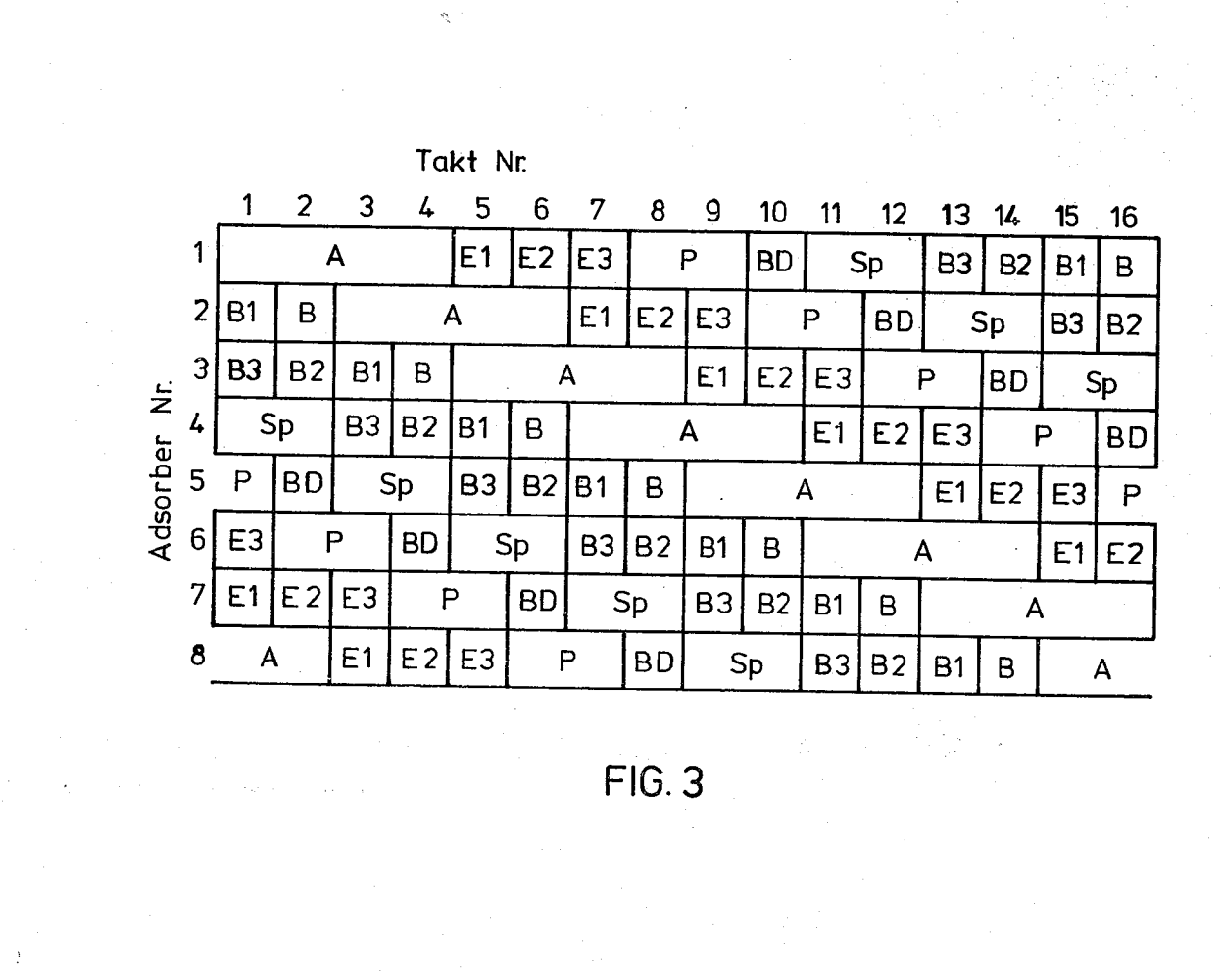

FIG. 3 shows an example of a second valve operation pattern predefined for a reduced number of eight adsorbent beds. If according to this example in the adsorbent bed No. 9 of FIG. 1 a defect valve is identified, that adsorbent bed is excluded from further operation by continuing operation according to the valve operation pattern of FIG. 3.

Switching from one valve operation step to the next is initiated when at first characteristic physical quantity has reached a predetermined value, e.g. after a certain time interval. The figures on the top of FIGS. 2 and 3 then refer to subsequent time intervals of operation.

The simplest second physical quantity which is observed for the identification of a defect valve is for example the position of a limit switch provided for at each valve. The nominal value of this second physical quantity is that any limit switch of any valve operated during the respective time interval has been switched.

A deviation is found if a valve does not react to a command to switch. In this case the faulty valve is immediately identified.

However, usually a valve loses its sealing properties gradually, so that in the initial stages of such a defect certain deviations first of all occur, for example in the pressure equalization between two adsorption units which do not, however, immediately necessitate stopping of the overall process. The identification of the valve responsible for such deviation is not immediately possible since a number of valves opening into one pipe can be responsible for such a deviation. For the identification of such a deviation it is therefore necessary to choose a more sophisticated second physical quantity to identify a defective valve. The choice of this second physical quantity must be in connection with the choice of the first physical quantity according to which stepping from one operation step to the next is initiated.

If, for example the aforementioned value of the first physical quantity is a predetermined time interval, the second physical quantity is preferably pressure, the actual values thereof being measured in each adsorbent bed. The nominal values of this second physical quantity are predetermined taking into account an also predetermined valve characteristic. If in an adsorbent bed a deviation of the actual measured pressure from the nominal pressure is observed then in the case of a measured too high pressure any closed valve leading from the said absorbent bed to connecting pipes with higher pressure is identified as a potentially defective valve. In the next valve operation step pressure has changed in most of the adsorbent beds and connecting pipes. Accordingly the deviations of measured values from nominal values are changed also. Again a certain number of valves can be identified as being potentially defective. But those valves which have not been identified in both operation steps as potentially defective can be excluded from the number of potentially defective valves. Finally the actually defective valve is identified which is the sole potentially defective valve in any of a number of successive operation steps. Normally for the identification of a valve leading to a connecting tube for pressure equalization a number of three successive operation steps are sufficient after the first occurrence of a deviation of measured value from nominal value of the second physical quantity. In other cases up to five successive operation steps are necessary.

The most preferred first physical quantity is pressure, switching being initiated when the predetermined pressure is reached in any of the adsorbent beds and/or connecting tubes. Preferably the switching initiating pressure is measured in the repressurized adsorbent bed. In this case the second physical quantity can be chosen as time; the actual value thereof being the time interval until a particular switch-initiating pressure is reached. The nominal value is predetermined in accordance with the valve characteristics.

According to another embodiment of the present invention during a predetermined time interval a predetermined pressure in the adsorbent beds and/or connecting tubes is realized by valve operation control. The second physical quantity can then be chosen by the valve setting. The actual valve setting is then compared to the nominal valve setting predetermined with respect to the valve characteristics.

If a valve is detected in this way as actually being defective a transition takes place from the first valve operation pattern originally prescribed to the second valve operation pattern, this second operation pattern excluding that adsorbent bed to which the defective valve belongs. The defective valve can now be replaced without switching off the installation it being appropriate for the valves contained in the installation to be guarded at least on one side with shutters so that the installation is not aerated during the repairing of the valve.

We now refer to the examples of valve operation patterns of FIGS. 2 and 3. We assume that a valve belonging to the ninth adsorbent bed has been identified as being defective. It can be seen that upon stopping the ninth adsorbent unit after the 18th step of the first operation pattern an immediate transition can take place from the first pattern to the second operation pattern, since the adsorbent units 1 to 8 are in the correct operation phase at this moment. The ninth adsorbent bed is in the adsorption phase at the time of the transition from the first to the second operation pattern, i.e. it has a high pressure. Depending on what repairs have to be conducted, or which valve has to be replaced, the pressure can if necessary be reduced by opening the residual gas valve 94.

The capacity of an adsorbent bed is determined by the feed rate of crude gas, i.e. by the quantity of impurities contained in the crude gas, as well as by the adsorption period during one process cycle. Following the transition to the prescribed second operation pattern according to FIG. 3 the number of steps during which one unit is available for adsorption is now only 4 out of 16 steps. Accordingly the rate of the crude gas introduction for maintaining the performance of the whole system is increased. Owing to this there are changes in pressure in the various process and pressure equalization phases. The adjustment which is therefore necessary in the transition from one operation pattern to another is appropriately conducted during a synchronisation phase.

If such a defect does occur which does not allow the installation to be continued to be operated up to an operation step at which an immediate transition to the second operation pattern is possible the transition can be brought about by intermediate synchronisation steps. The synchronisation steps differ from the prescribed steps according to the operation patterns which are used for an uninterrupted process cycle by the fact that certain steps are repeated or certain pressure equalization processes are conducted by repressurization from the pure gas system or by depressurization into the residual gas system. The transitional steps have to be defined for each possible operation step according to the prescribed operation patterns. If the operation patterns have been well adapted the duration of the synchronisation phase is in general not more than 2 to 3 operation steps.

By application of the process of this invention a continuous operation of pressure swing adsorption installations is possible. This is particularly advantageous if a pressure swing adsorption process is operated in a product line and the crude gas generation process cannot be stopped if due to a valve defect the pressure swing process must be stopped according to the prior art. The crude gas in such a case must be released to the atmosphere. Production upstream of the pressure swing adsorption has to be stopped too. Costs of such stoppages can hardly be calculated, as in no way can they be related to the pure gas costs.

What is claimed is:

1. In an adiabatic pressure swing adsorption process for separation of gas mixtures by adsorbing at least one gas component in each of at least eight phase staggered operated adsorbent beds;

wherein each of the adsorbent beds is cyclically operated in subsequent operation steps including adsorption, at least two depressurization steps, countercurrent purging, and at least two; repressurization steps; depressurization and repressurization being established by pressure equalization with another adsorbent bed being operated in the operation step repressurization depressurization respectively of adjacent pressure range by means of a number of connecting tubes and valves opening from said adsorbent beds to said connecting tubes; the valves being switched according to a predetermined first valve operation pattern; switching of valves being initiated when a first characteristic physical quantity has reached a predetermined value; the improvement comprising periodically compairing measured actual values with predetermined corresponding nominal values of a second physical quantity characteristic for each operation step; in the case of deviations of the actual values from the nominal values, identifying any valve being potentially defective and therefore potentially responsible for said deviations in any of subsequent operation steps after the first occurence of deviation; identifying the actual defective valve as being the sole valve being identified as potentially defective in any of a sufficient number of operation steps to exclude other valves being also identified as potentially defective in said operation step of first occurance of a deviation; excluding the adsorption bed to which the defective valve belongs from operation by continuing operation of the remaining adsorption beds according to a second valve operation pattern predefined for a such reduced number of adsorption beds.

2. The process according to claim 1 wherein the first physical quantity is a predetermined time interval and the second physical quantity is pressure, the actual values thereof are measured in at least one of the adsorbent beds and the connecting tubes, the nominal values thereof being predetermined according to the valve characteristics.

3. The process according to claim 1 wherein the first physical quantity is pressure, switching being initiated when the predetermined value is reached in any of the adsorbent beds and connecting tubes, and the second physical quantity is time, the actual values thereof being the time interval until a particular switch-initiating pressure is reached, the nominal values thereof being predetermined according to the valve characteristics.

4. The process according to claim 3 wherein the first physical quantity is the pressure in the repressurized adsorbent bed.

5. The process according to claim 1 wherein the first physical quantity is a predetermined time interval, during which a predetermined pressure in at least one of the adsorbent beds and connecting tubes is realized by valve operation control, and the second physical quantity is the valve setting, the nominal values of the valve setting being predetermined according to the valve characteristics.

6. The process according to one of claims 1 to 5 wherein if during operation according to the second valve operation pattern a defective valve is identified the adsorbent bed to which the defective valve belongs is excluded from operation by continuing operation of the remaining adsorbent beds according to a third valve operation pattern predefined for a such reduced number of adsorbent beds.

* * * * *

UNITED STATES PATENT AND TRADEMARK OFFICE
CERTIFICATE OF CORRECTION

PATENT NO. : 4,234,322
DATED : Nov. 18, 1980
INVENTOR(S) : Herman De Meyer et al It is certified that error appears in the above-identified patent and that said Letters Patent are hereby corrected as shown below:

Title Page   Delete "Bayer Aktiengesellschaft,
Assignee     Leverkusen" and insert --Linde
             Aktiengesellschaft, Wiesbaden--.

Signed and Sealed this

Sixth Day of July 1982

[SEAL]

Attest:

GERALD J. MOSSINGHOFF

Attesting Officer   Commissioner of Patents and Trademarks